US005749957A

United States Patent [19]
Kieser et al.

[11] Patent Number: 5,749,957
[45] Date of Patent: May 12, 1998

[54] EFFECT POWDER COATINGS

[75] Inventors: Manfred Kieser, Darmstadt; Afred Hennemann, Pfungstadt; Otto Stahlecker, Darmstadt, all of Germany

[73] Assignee: Merck Patent Gesellschaft mit beschrankter Haftung, Darmstadt, Germany

[21] Appl. No.: 561,939

[22] Filed: Nov. 22, 1995

[30] Foreign Application Priority Data

Dec. 5, 1994 [DE] Germany .......................... 44 43 048.5

[51] Int. Cl.⁶ ............................................. C09C 1/62
[52] U.S. Cl. .................... 106/403; 106/404; 106/415; 106/417; 106/418
[58] Field of Search .................. 106/403, 404, 106/415, 417, 418; 523/220; 252/518, 519, 520, 500, 511; 428/363, 402, 403

[56] References Cited

U.S. PATENT DOCUMENTS

| | | |
|---|---|---|
| 3,843,571 | 10/1974 | Fitztgerald .................. 523/220 |
| 3,932,349 | 1/1976 | Camelon et al. .............. 260/42.14 |
| 3,941,731 | 3/1976 | Camelon et al. .............. 523/205 |
| 3,980,607 | 9/1976 | Johannes ..................... 523/440 |
| 4,003,872 | 1/1977 | Rolles et al. ................. 523/457 |
| 4,197,351 | 4/1980 | Rolles et al. . |
| 4,292,087 | 9/1981 | Bell .......................... 106/193 M |
| 4,598,020 | 7/1986 | Panush ....................... 428/411.1 |
| 4,937,274 | 6/1990 | Arima et al. ................. 523/220 |
| 5,116,672 | 5/1992 | Mosser et al. ................ 428/328 |
| 5,187,220 | 2/1993 | Richart et al. ................ 524/441 |
| 5,221,341 | 6/1993 | Franz et al. . |
| 5,320,781 | 6/1994 | Stahlecker et al. ............. 106/415 |
| 5,409,970 | 4/1995 | Mosser et al. ................ 523/223 |

FOREIGN PATENT DOCUMENTS 2005491  12/1988  Canada .

*Primary Examiner*—Deborah Jones
*Attorney, Agent, or Firm*—Millen, White, Zelano, & Branigan, P.C.

[57] ABSTRACT

Effect powder coating compositions which contain 0.1–10% by weight of conductive pigments, the process for their preparation and their use.

21 Claims, No Drawings

EFFECT POWDER COATINGS

The present invention relates to effect powder coatings which contain from 0.1 to 10% by weight of conductive pigments, to a process for their preparation and to their use.

BACKGROUND OF THE INVENTION

Coatings are generally produced by application of complete coating compositions, i.e. coating systems, which when applied contain all of the necessary constituents, for example binders, pigments, fillers, additives, solvents, etc., of a coatings For certain applications, different processes are known in which binder and effect substances are employed separately, examples being flocking, scatter coating, spray lay-up, etc.

Powder coatings, i.e. solvent-free and environment-friendly coating systems, are also commonly employed as complete, materially uniform systems. In many cases, however, this leads to great problems in terms of application.

When using powder coatings, their application to a substrate is generally accompanied by separation phenomena. These may involve, for example, a depletion of the fine particles in the recovered powder coating. This separation causes changes in the processing properties and optical properties of the coating.

The problem of separation is intensified in pigmented powder coatings. Tinting, or the mixing of different-colored powder coatings, is not possible, because such mixtures are not stable to separation. Similarly, once the color has been produced, it is not possible to change it subsequently by mixing with a powder coating which differs only in its pigmentation.

Attempts have been made in practice, in some cases by relatively complex measures, to avoid the problem of separation. For instance, automatic metering devices may be used to add continuously as constant as possible a proportion of fresh powder to the overspray.

In the case of subsequent addition (dry blending) of metallic or pearl luster pigments there is seen—depending on the powder coating and luster pigment—to be an enrichment or depletion of pigments on the surface of the article to be coated. The reason for this is the difference in charging characteristics between the powder coating particles and the luster pigment particles. The optical properties of the coated articles, for example gloss, color and hiding power, differ markedly from those which have been coated with used overspray material. Problems occur with the reuse of overspray even in conjunction with a large quantity of original material.

DE 24 34 855 describes a process for the preparation of metallic-pigmented powder coatings, in which a brushing process is used to fix the pigment platelets on the surface of the powder coating particles. Powder coating and effect pigment are joined by introducing mechanical and, optionally, thermal energy.

The equipment required for this is highly complex, which is reflected in the high costs of preparation of the luster-pigmented powder coatings. In addition, the powder coatings obtained in this way are frequently of insufficient gloss. A further disadvantage is that the possibility of modifying the color subsequently is limited.

A further disadvantage is that, in powder coatings, the preparation process means that luster pigments cannot be employed in the conventional manner. For the preparation of powder coatings, all constituents are mixed in the melt in extruders and the extruded, fragmented powder coating is sent as solid material to a mill, where it is milled to the particle size necessary for application. In this milling process, however, a large proportion of the luster pigment platelets is destroyed, resulting in a reduction in the luster effect.

An object of the invention was, therefore, to find powder coatings which are distinguished by their high gloss and/or speckled effects and have none of the above-mentioned disadvantages.

SUMMARY OF THE INVENTION

Upon further study of the specification and appended claims, further objects and advantages of this invention will become apparent to those skilled in the art.

Surprisingly it has now been found that the separation of the powder coating particles when effect powder coatings are applied to an article is suppressed if the powder coating contains conductive pigments, although the pigmented powder coating is not itself conductive. The addition of conductive pigment has the effect of making the luster pigment-containing powder coatings stable to separation. After the addition of the conductive pigments there is no longer any change in the particle size distribution.

The invention therefore relates to effect powder coatings which contain from 0.1 to 10% by weight of conductive pigments.

The invention also relates to a process for the preparation of the effect powder coatings according to the invention, whose distinguishing feature is that one or more conductive pigments and, if desired, one or more luster pigments and the powder coating are mixed intensively with one another.

The conductive pigments are an essential constituent of the effect powder coatings according to the invention. All conductive pigments which are known to the person skilled in the art may be used, with preference being given to pigments having a powder resistance (measured in Kleber cell) of less than $1 \times 10^7$ Ω, preferably less than $1 \times 10^6$, for example $1 \times 10^3$ to $1 \times 10^6$ Ω, further, less than $1 \times 10^3$ Ω may be desired. Particularly suitable conductive pigments are metal pigments, nonmetallic powders, for example black, doped metal oxides and pulverulent support materials which are coated with a conductive layer, as described, for example, in EP 0 373 575. A mixture of different conductive pigments may also be added to the powder coating. If the powder coating according to the invention contains one or more luster pigments which are themselves of adequate conductivity, then the addition of a further conductive pigment is not absolutely necessary. Luster pigments include, in particular, metallic pigments and pearl luster pigments.

Separation of luster pigment from powder coating or within the powder coating itself can generally be stopped by an addition of only from 0.1 to 10% by weight, preferably 0.3–7% by weight and in particular 0.5–5% by weight of conductive pigment. The concentration required, however, depends essentially on the powder conductivity and on the geometry (size and shape) of the pigment employed.

The luster pigments employed are preferably commercial pulverulent metallic pigments, such as aluminum flakes, for example Standard® from Eckart, luster pigments, for example Paliochrom® from BASF, iron oxide in platelet form and pearl luster pigments—mica flake pigments coated with metal oxides—which are obtainable, for example, from Merck under the tradename Iriodin®. The latter are known, for example, from the German Patents and Patent Applications 14 67 468, 19 59 998, 20 09 566, 22 14 545, 22 15 191, 22 44 298, 23 13 331, 25 22 572, 31 37 808, 31 37 809, 31 51 343, 31 51 356, 31 51 355, 32 11 602, 32 35 017, 33 34 598 and 35 28, 256. Luster pigments which already themselves possess adequate conductivity are described in DE-A 41 21 352. In the presence of atmospheric humidity, these luster pigments—doped with alkaline earth metal ions—exhibit a degree of conductivity which is sufficient to stop the separation of luster pigment from powder coating. It is also possible, for example in order to improve the weather resistance, to employ surface-modified luster pigments.

The proportion of the luster pigment component in the powder coating according to the invention may be from 0.1 to 40% by weight, preferably from 0.5 to 20% by weight and in particular from 1 to 10% by weight, based on the overall mixture.

All commercial powder coatings can be used for the modified powder coating, these powder coatings commonly being based on reactive epoxides, polyesters, polyacrylates or polyurethanes, and also on other polymers which may be both reactive and thermoplastic. Particular preference is given to polyester powder coatings, epoxide powder coatings and polyester-epoxide powder coatings, acrylate powder coatings and mixtures of different powder coatings.

Following the addition of conductive pigments, mixtures of different powder coatings, for example commercial powder coatings which differ chemically and/or in terms of color, are stable to separation when applied. In the case of color modifications (tints), however, it is advantageous if at least one component of the resulting pigmented powder coating mixture has a particle size of less than 10–20 µm, since otherwise the different powder coating particles may remain individually recognizable. By the deliberate use of coarser powder coating particles, preferably >30 µm particle size, it is possible to obtain powder coating mixtures with particular effects, for example speckled effects or a heterogeneous coating structure.

In addition to the pigment component the effect powder coating according to the invention may contain further components, for example flow aids and levelling agents.

The preparation of the effect powder coatings according to the invention is simple and easy to manage. The pigment component—conductive pigment or the mixture of nonconductive luster pigment and conductive pigment—is mixed intensively with the powder coating, using, for example, a blade mixer or drum mixer In this context the individual components can be admixed simultaneously or in succession with the powder coating. If more than one component is added to the powder coating, then it is advisable for reasons of ease of management to admix the finished pigment mixture, consisting for example of conductive pigment and luster pigment, to the powder coating. The effect powder coating obtained is stable on storage, i.e. no separation occurs. If the effect powder coating according to the invention is applied by, for example, an electrostatic method to the substrate material to be coated, then the procedure employed results in the substrate surface being covered completely with a homogeneous powder coating layer.

Like the base powder coating, the powder coating according to the invention can be applied to any desired substrate materials, for example the metals:iron, steel, aluminum, copper, bronze and brass, and metal foils, or to conductive modified surfaces of glass, ceramic and cncrete and the like, and also to nonconducting surfaces such as wood, for example in the form of furniture, or to glass, ceramic, plastics, inorganic building materials or other materials, for decorative and/or protective purposes.

In order to improve the quality of the surface it is also possible, in addition, to apply one or more clearcoat layers to the effect powder coating layer, which generally brings about an improvement not only in the appearance but also in the durability of the overall coating. The transparent finishing coat, however, is not absolutely necessary.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. P 44 43 048.5, filed Dec. 5, 1994, are hereby incorporated by reference.

The examples which follow are intended to illustrate the invention in more detail without limiting it:

EXAMPLES

Example 1

5 g of Iriodin 103 ($TiO_2$ mica pigment with a particle size of 10–50 µm from Merck, Darmstadt, FRG) and 2 g of Minatec 30 CM (conductive pigment from Merck, Darmstadt, FRG) are intensively mixed with 93 g of Teodur 00013 (polyester TGIC powder coating from Teodur NV, Breda, Netherlands). The mixture is applied electrostatically to an aluminum panel. The unbaked coating layer is removed and the pigment content is determined. The overall pigment content (pearl luster pigment and conductive pigment) is 6.9% (ignition residue). There was no separation. The resistance of the conductive pigment in the Kleber measuring cell is 330 $\Omega$. The resistance of the powder coating was greater than $10^{12}$ $\Omega$.

Comparison 5 g Iriodin 103 are mixed intensively with 95 g of Teodur 00013 (polyester TGIC powder coating from Teodur NV, Breda, Netherlands). The mixture is applied electrostatically to an aluminum panel. The unbaked coating layer is removed and the pigment content is determined. The pigment content (pearl luster pigment) is 2.9%. The mixture was not stable to separation.

Example 2

5 g of Standart Spezial PC 20 (aluminum, pigment from Eckart, Fürth/Bavaria, FRG) and 2 g of Minatec 30 CM (conductive pigment from Merck, Darmstadt, FRG) are mixed intensively with 93 g of Teodur 00013 (polyester TGIC powder coating from Teodur NV, Breda, Netherlands). The mixture is applied electrostatically to an aluminum panel. The unbaked coating layer is removed and the pigment content is determined. The overall pigment content, calculated as aluminum pigment PC 20 and conductive pigment, is 7.1e. There was no separation. The resistance of the conductive pigment in the Kleber measuring cell is 330 $\Omega$. The resistance of the powder coating was greater than $10^{12}$ $\Omega$.

Comparison 5 g of Standart Spezial PC 20 aluminum pigment from Eckart, Fürth/Bavaria, FRG) are mixed intensively with 95 g of Teodur 00013 (polyester TGIC powder coating from Teodur NV, Breda, Netherlands). The mixture is applied electrostatically to an aluminum panel. The unbaked coating layer is removed and the pigment content is determined. The pigment content, calculated as aluminum pigment, PC 20, is 3.370 The mixture was not stable to separation.

Example 3

5 g of Iriodin 103 and 2 g of Sacon P 401 (conductive pigment from Sachtleben, FRG) are mixed intensively with 93 g of Teodur 00013 (polyester TGIC powder coating from Teodur NV, Breda, Netherlands). The mixture is applied electrostatically to an aluminum panel. The unbaked coating layer is removed and the pigment content is determined. The overall pigment content (pearl luster pigment and conductive pigment) is 7.0%. There was no separation. The resistance of the conductive pigment in the Kleber measuring cell is 480 U. The resistance of the powder coating was greater than $10^{12}$ Q.

Comparison 5 g of Iriodin 103 are mixed intensively with 95 g of Teodur 00013 (polyester TGIC powder coating from Teodur NV, Breda, Netherlands). The mixture is applied electrostatically to an aluminum panel. The unbaked coating layer is removed and the pigment content is determined. The pigment content (pearl luster pigment) is 2.9%. The mixture was not stable to separation.

Example 4

5 g of Iriodin 103 (pearl luster pigment from Merck, Darmstadt, FRG) and 0.5 g of Printex XE 2 (conductive pigment from Degussa, Hanau, FRG) are mixed 5 intensively with 94.5 g of Teodur 00013 (polyester TGIC powder coating from Teodur NV, Breda, Netherlands). The mixture is applied electrostatically to an, aluminum panel. The unbaked coating layer is removed and the pigment content is determined. The pigment content (pearl luster pigment) is 5.0%. There was no separation. The resistance of the conductive pigment in the Kleber measuring cell is <20° C. The resistance of the powder coating was greater than $10^{12}$ Ω.

Comparison 5 g of Iriodin 103 are mixed intensively with 95 g of Teodur 00013 (polyester TGIC powder coating from Teodur NV, Breda, Netherlands). The mixture is applied electrostatically to an aluminum panel. The unbaked coating layer is removed and the pigment content is determined. The pigment content (pearl luster pigment) is 2.9%. The mixture was not stable to separation.

Example 5

5 g of Iriodin 119 ($Ca^{2+}$-doped $TiO_2$ mica pigment with a particle size of 5–25 μm from Merck, Darmstadt, FRG) are mixed intensively with 95 g of Teodur 00013 (polyester TGIC powder coating from Teodur NV, Breda, Netherlands). The mixture is applied electrostatically to an aluminum panel. The unbaked coating layer is removed and the pigment content is determined. The pigment content (pearl luster pigment) is 5.0%. There was no separation. The resistance of the conductive pigment, Iriodin 119, in the Kleber measuring cell is 1 megaohm, i.e., $10^6$ Ω (60% rel. humidity). The resistance of the powder coating was greater than $10^{12}$ Ω.

Comparison 1

5 g of Iriodin 120 ($TiO_2$ mica pigment with a particle size of 5–25 μm from Merck, Darmstadt, FRG) are mixed intensively with 95 g of Teodur 00013 (polyester TGIC powder coating from Teodur NV, Breda, Netherlands). The mixture is applied electrostatically to an aluminum panel. The unbaked coating layer is removed and the pigment content is determined. The pigment content (pearl luster pigment) is 6.7%. The mixture was not stable to separation. The resistance of the Iriodin 120 was $10^8$ Ω (60% rel. humidity).

Comparison 2

The mixture indicated in Example 5 is dried (2 h, 20° C., 50 mbar) and then processed analogously. The pigment content found on the panel is 6.0%. The resistance of the "conductive" pigment in the Kleber measuring cell is 25 megaohms, i.e., $2.5 \times 10^7$ Ω, (dried at 120° C.) The mixture was no longer stable to separation.

Example 6

48 g of Teodur 00013 (polyester TGIC powder coating from Teodur NV, Breda, Netherlands) are mixed intensively with 2 g of Minatec 30 CM (conductive pigment from Merck, Darmstadt, FRG) and the mixture is then applied electrostatically to an aluminum panel. The unbaked coating layer is removed. The particle size distribution of the starting material and of the material on the panel is analyzed. The particle size distribution did not change.

Comparison 50 g of Teodur 00013 (polyester TGIC powder coating from Teodur NV, Breda, Netherlands) are applied electrostatically to an aluminum panel. The unbaked coating layer is removed. The particle size distribution of the starting material and of the material on the panel is analyzed. The particle size distribution changed markedly, the fine particles (<10 μm) and the coarse particles (>40 μm) increased in proportion. The powder coating was not stable to separation.

Example 7

49 g each of Interpon 600 black and Interpon 600 pure white (polyester powder coating from International Powder Coating, Bensheim, FRG) were milled to a particle size of less than 10 μm using an air jet mill. The two powder coatings were combined and mixed intensively with 2 g of Minatec 30 CM (conductive pigment from Merck, Darmstadt, FRG) and the mixture was then applied electrostatically to an aluminum panel and baked. The overspray was collected and, likewise, applied electrostatically to a panel and baked. Both panels exhibit a uniform coating layer. There were no visible defects in levelling or streaks or shadows. The optical properties (color, gloss, hiding power) are identical for both panels.

Comparison 50 g each of Interpon 600 black and Interpon 600 pure white (polyester powder coating from International Powder Coating, Bensheim, FRG) were milled to a particle size of less than 10 μm using an air jet mill. The two powder coatings were combined and mixed intensively, and the mixture was then applied electrostatically to an aluminum panel and baked. The overspray was collected, applied electrostatically to an aluminum panel and baked. The first panel had a distinctly lighter-colored coating layer than the panels with conductive pigment. The panel from the overspray has a distinctly darker coating layer, both in comparison with the panel from the original material and in relation to the panels with conductive pigment.

Example 8

29 g of Interpon 600 black (polyester powder coating from International Powder Coating, Bensheim, FRG), 69 g of Teodur 00013 (TGIC powder coating from Teodur NV, Breda, Holland) and 2 g of Minatec 30 CM (conductive pigment from Merck, Darmstadt, FRG) were mixed intensively, and the mixture was then applied electrostatically to an aluminum panel and baked. The overspray was collected and was, likewise, applied electrostatically to an aluminum panel and baked. Both panels exhibit a clear coating with black dots. The color impression given by both panels is identical.

Comparison 30 g of Interpon 600 black (polyester powder coating from International Powder Coating, Bensheim, FRG) and 70 g of Teodur 00013 (polyester TGIC powder coating from Teodur NV, Breda, Netherlands) are mixed intensively and the mixture is then applied electrostatically to an aluminum panel and baked. The overspray was collected, applied electrostatically to an aluminum panel and baked. The first panel exhibits a clear coating layer with very few dark specks. The panel from the overspray exhibited a much darker coating layer with streaks.

These panels are markedly different. They also differ greatly from the panels from Example 8, i.e., those with addition of conductive pigment.

Example 9

A pigment mixture consisting of 5 g of Iriodin 103 and 2 g of Minatec 30 CM is mixed intensively with 93 g of Teodur 00013 (polyester TGIC powder coating from Teodur NV, Breda, Holland). The mixture is applied electrostatically to an aluminum panel. There was no separation. The results obtained were the same as in Example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A powder coating composition exhibiting a luster effect comprising a powder coating component and from 0.1 to 10% by weight of at least one conductive pigment.

2. The powder coating composition according to claim 1, wherein the at least one conductive pigment is a pulverulent support material covered with a conductive layer, a conductive nonmetallic powder, a conductive metal pigment or a conductive doped metal oxide.

3. The powder coating composition of claim 1, wherein the conductive pigment is a conductive luster pigment.

4. The powder coating composition of claim 1, further comprising one or more non-conductive luster pigments.

5. The powder coating of claim 4, wherein the proportion of luster pigment is 0.1–40% by weight, based on the overall coating composition.

6. The powder coating composition of claim 4, wherein the powder coating component is a polyester, polyacrylate, polyurethane, epoxide or polyester-epoxide powder coating.

7. A process for the preparation of a powder coating composition exhibiting a luster effect, which comprises: adding from 0.1 to 10% by weight of one or more conductive pigments and, optionally, one or more luster pigments to a powder coating component, simultaneously, separately or as a pigment mixture, and mixing the components intensively with one another.

8. The powder coating composition of claim 1, wherein the powder coating component is a mixture of two or more powder coating components which differ chemically or differ, in terms of color or both.

9. The powder coating composition of claim 8, wherein at least one component of the composition has a particle size of less than 20 µm.

10. The powder coating composition of claim 8, wherein the powder coating component contains particles having a particle size of >30 µm.

11. A coated article comprising a metal, wood, glass, ceramic, plastic or inorganic building material substrate, and a coating from the composition of claim 1 thereon.

12. The coated article of claim 11, wherein the coating is applied to the substrate electrostatically.

13. The powder coating composition of claim 1, which provides a non-conductive coating.

14. The powder coating composition of claim 1, wherein the at least one conductive pigment has a powder resistance of less than $1.0 \times 10^7$ Ω.

15. The powder coating composition of claim 1, wherein the at least one conductive pigment has a powder resistance of less than $1.0 \times 10^6$ Ω.

16. The powder coating composition of claim 1, which comprises 0.3 to 7.0% by weight of the at least one conductive pigment.

17. The powder coating composition of claim 1, which comprises 0.5 to 5.0% by weight of the at least one conductive pigment.

18. The powder coating composition of claim 4, wherein at least one luster pigment is a pulverulent metallic pigment or pearl luster pigment.

19. The powder coating composition of claim 3, wherein the conductive luster pigment is a luster pigment doped with alkaline earth metal ions.

20. The powder coating composition of claim 8, wherein at least one component of the composition has a particle size of less than 10 µm.

21. A powder coating composition exhibiting a luster effect comprising a powder coating component and either:
   a) 0.1 to 10% by weight of at least one conductive luster pigment or
   b) at least one non-conductive luster pigment and 0.1 to 10% by weight of at least one conductive non-luster pigment.

* * * * *